Aug. 24, 1965      E. W. BECHTOLD      3,202,051
SYMMETRICAL THREE ELEMENT LENS SYSTEM
Filed April 16, 1964
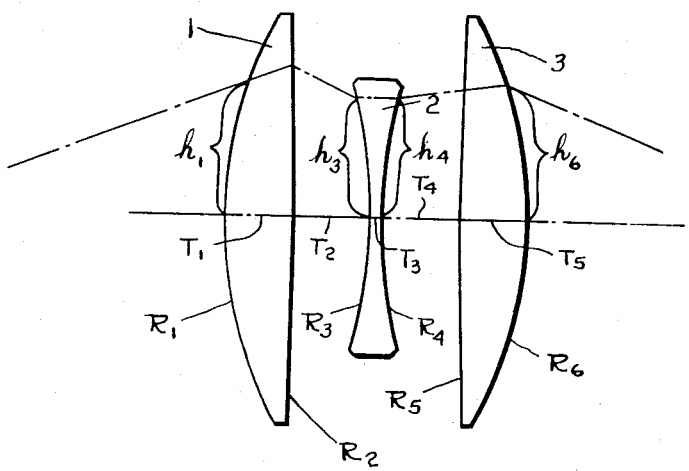
INVENTOR.
EDWIN W. BECHTOLD

United States Patent Office 3,202,051
Patented Aug. 24, 1965

3,202,051
SYMMETRICAL THREE ELEMENT LENS SYSTEM
Edwin W. Bechtold, Middle Village, N.Y., assignor to The Ednalite Corporation, Westchester County, N.Y., a corporation of New York
Filed Apr. 16, 1964, Ser. No. 363,044
4 Claims. (Cl. 88—57)

This invention relates to a new and improved lens system particularly adapted for use in photo copying apparatus, and this application is a continuation-in-part of my co-pending application Serial No. 110,565, filed May 16, 1961, now abandoned.

It is well known that in most optical systems there is a fall off in the intensity of illumination in the image which varies as the fourth power of the cosine of the field angle. In addition to that, most optical systems severely restrict the diameter of the oblique pensils of rays for the purpose of improving image quality but thereby aggravate the decrease in oblique illumination.

Accordingly, the principal object of this invention is to provide a new and improved lens system with not over three single elements, so as to be relatively simple and inexpensife, and which reduces the vignetting to a negligible quantity of less than five percent.

The above, and other objects and advantages of the invention, will be apparent from the following detailed description which is to be read in connection with the accompanying drawing in which a preferred embodiment of the invention has been shown by way of illustration only.

In the drawing, the single view is a diagrammatic axial section of a lens system according to the invention.

The lens system embodying the present invention is particularly adapted for use in photo copying apparatus and for other uses where a range of magnifications of from one-half to one, to two to one is desired.

The illustrated lens system embodying the present invention is a symmetrical three element lens system comprising a pair of oppositely disposed outer elements 1 and 3 and a completely symmetrical center element 2 disposed equidistantly between the outer elements 1 and 3.

I have found that particular ranges of refractive index and dispersive index for the lens elements, particular ranges of the radii of curvature at the refractive surfaces of the lens elements and a particular range for the sum of the reduced thicknesses of the lens elements and the air spaces therebetween, that is, the thicknesses divided by the respective indices of refraction, are effective to achieve the desired results, whereas refractive and dispersive indices, radii of curvature and sums of the reduced thicknesses falling outside of the stated ranges do not. These particular ranges may be summarized as follows:

REFRACTIVE AND DISPERSIVE INDICES $$1.65 < N_1 < 1.70$$
$$1.68 < N_2 < 1.75$$
$$1.65 < N_3 < 1.70$$
$$V_1 > 47.0$$
$$V_2 < 31.0$$
$$V_3 > 47.0$$

where N is the index of refraction of the glasses for D light, that is, the D line of the spectrum, V is the dispersive index of the glasses and the subscripts denote the lenses numbered consecutively from the front to rear of the lens system.

RADII OF CURVATURE $$+.35F < R_1 < +.43F$$
$$-4F < R_2 < -12F$$
$$-.440F < R_3 < -.495F$$
$$+.440F < R_4 < +.495F$$
$$+4F < R_5 < +12F$$
$$-.35F < R_6 < -.43F$$

where F is the equivalent focal length of the lens system, R is the radius of curvature of each refractive surface, the subscripts denote the surfaces numbered consecutively from the front to rear of the lens system, positive values of radius denote surfaces that are convex to the front and negative values of radius denote surfaces that are concave to the front.

SUM OF REDUCED THICKNESSES $$.24F < (t_1/N_1 + t_2 + t_3/N_2 + t_4 + t_5/N_3) < .27F$$

where $t_1$, $t_3$ and $t_5$ refer to the axial thicknesses of the lens elements 1, 2 and 3, respectively, $t_2$ and $t_4$ refer to the axial air spaces between elements 1 and 2 and between elements 2 and 3, respectively, and $N_1$, $N_2$ and $N_3$ and F have the meanings indicated above.

A preferred embodiment of the invention is constructed in proportions substantially as specified in the following table:

Table I

| Lens | Radii | Thicknesses and Air Spaces | N | V |
|---|---|---|---|---|
| 1 | $R_1 = +.399F$ | $t_1 = .055F$ | 1.670 | 47.2 |
|   | $R_2 = -6.991F$ | $t_2 = .0935F$ | Air | |
| 2 | $R_3 = -.474F$ | $t_3 = .0096F$ | 1.689 | 30.9 |
|   | $R_4 = +.474F$ | $t_4 = .0935F$ | Air | |
| 3 | $R_5 = +6.991F$ | $t_5 = .055F$ | 1.670 | 47.2 |
|   | $R_6 = -.399F$ | | | | where the first column gives the lens elements numbered in order from front to rear, and R, t, N and V, and the several subscripts all have the previously indicated meanings.

In a specific example of the invention having an effective focal length of 111 mm., the symmetrical three element lens system has the numerical data substantially as follows:

Table II

| Lens | Radii (mm.) | Thickness and Air Spaces (mm.) | N | V |
|---|---|---|---|---|
| 1 | $R_1 = +44.3$ | $t_1 = 6.12$ | 1.670 | 47.2 |
|   | $R_2 = -776.3$ | $t_2 = 10.38$ | Air | |
| 2 | $R_3 = -52.7$ | $t_3 = 1.07$ | 1.689 | 30.9 |
|   | $R_4 = +52.7$ | $t_4 = 10.38$ | Air | |
| 3 | $R_5 = +776.3$ | $t_5 = 6.12$ | 1.670 | 47.2 |
|   | $R_6 = -44.3$ | | | |

In the lens systems embodying this invention, the ratio of the height above the axis (indicated at h on the drawing) of a ray coming from an axial point on the object and incident at the front surface of lens 1, to the height above the axis of that same ray incident at the front surface of center lens 2 (which height is indicated at $h_3$ on the drawing), is between 1.17 and 1.22 when the lens system is used for one to one magnification. When the lens system is to be used for other magnifications, the lens system as a whole is adjusted to proper position for such other desired magnification.

Although the invention has been described in detail with reference to a particular preferred embodiment thereof, it will be understood that variations and modifications can be effected therein without departing from the scope or spirit of the invention as defined in the appended claims.

What is claimed is:

1. A symmetrical, air-spaced three element lens system in which the refractive indices N and the radii of curvature R, each category being numbered by subscripts from front to rear, are all between the respective limits specified in the following algebraic inequalities:

$$1.65 < N_1 < 1.70$$
$$1.68 < N_2 < 1.751$$
$$1.65 < N_3 < 1.70$$
$$+.35F < R_1 < +.43F$$
$$-4.0F < R_2 < -12.0F$$
$$-.440F < R_3 < -.495F$$
$$+.440F < R_4 < +.495F$$
$$+4.0F < R_5 < +12.0F$$
$$-.35F < R_6 < -.43F$$

where F denotes the equivalent focal length of the lens system, positive values of radius denote surfaces that are convex to the front and negative values of radius denote surfaces that are concave to the front, the dispersive indices $V_1$ and $V_3$ are each approximately 47.2 and the dispersive index $V_2$ is approximately 30.9, and wherein the sum of the reduced thicknesses of the three lens elements and of the air spaces therebetween is in the range between .24F and .27F.

2. A symmetrical three element lens system constructed substantially according to the specifications in the following table:

| Lens | Radii | Thicknesses and Air Spaces | N | V |
|---|---|---|---|---|
| 1 | $R_1 = +.399F$ | $t_1 = .055F$ | 1.670 | 47.2 |
|   | $R_2 = -6.991F$ | $t_2 = .0935F$ | Air | |
| 2 | $R_3 = -.474F$ | $t_3 = .0096F$ | 1.689 | 30.9 |
|   | $R_4 = +.474F$ | $t_4 = .0935F$ | Air | |
| 3 | $R_5 = +6.991F$ | $t_5 = .055F$ | 1.670 | 47.2 |
|   | $R_6 = -.399F$ | | | | where F is the equivalent focal length of the lens system; the first column gives the lens elements numbered in order from front to rear; $R_1$, $R_2$, $R_3$, $R_4$, $R_5$ and $R_6$ refer to the radii of curvature of the refractive surfaces numbered consecutively from the front to the rear of the lens system, with the plus and minus values denoting surfaces that are respectively convex and concave to the front; $t_1$, $t_3$ and $t_5$ refer to the axial thicknesses of the lens elements 1, 2 and 3, respectively, and $t_2$ and $t_4$ refer to the axial air spaces between elements 1 and 2 and between elements 2 and 3, respectively; and N and V denote the refractive and dispersive indices for the lens elements.

3. A symmetrical three element lens system having an effective focal length of 111 mm. and numerical data substantially as follows:

| Lens | Radii (mm.) | Thickness and Air Spaces (mm.) | N | V |
|---|---|---|---|---|
| 1 | $R_1 = +44.3$ | $t_1 = 6.12$ | 1.670 | 47.2 |
|   | $R_2 = -776.3$ | $t_2 = 10.38$ | Air | |
| 2 | $R_3 = -52.7$ | $t_3 = 1.07$ | 1.689 | 30.9 |
|   | $R_4 = +52.7$ | $t_4 = 10.38$ | Air | |
| 3 | $R_5 = +776.3$ | $t_5 = 6.12$ | 1.670 | 47.2 |
|   | $R_6 = -44.3$ | | | | where the first column gives the lens elements numbered in order from front to rear; $R_1$, $R_2$, $R_3$, $R_4$ $R_5$ and $R_6$ refer to the radii of curvature of the refractive surfaces numbered consecutively from the front to the rear of the lens system, with the plus and minus values denoting surfaces that are respectively convex and concave to the front; $t_1$, $t_3$ and $t_5$ refer to the axial thicknesses of the lens elements 1, 2 and 3, respectively, and $t_2$ and $t_4$ refer to the axial air spaces between elements 1 and 2 and between elements 2 and 3, respectively; and N and V denote the refractive and dispersive indices for the lens elements.

4. A symmetrical three element lens system as in claim 3; wherein the ratio of the height above the axis of a ray coming from an axial point on the object incident at the front surface of the front lens element to the height above the axis of that ray incident on the front surface of the central lens element is between approximately 1.17 and 1.22 when the lens system is used at one to one.

No references cited.

JEWELL H. PEDERSEN, *Primary Examiner.*

JOHN K. CORBIN, *Examiner.*